Sept. 12, 1939.  A. J. DEMPSEY  2,172,906
SAFETY TREE TRIMMER
Filed June 9, 1938  2 Sheets-Sheet 1
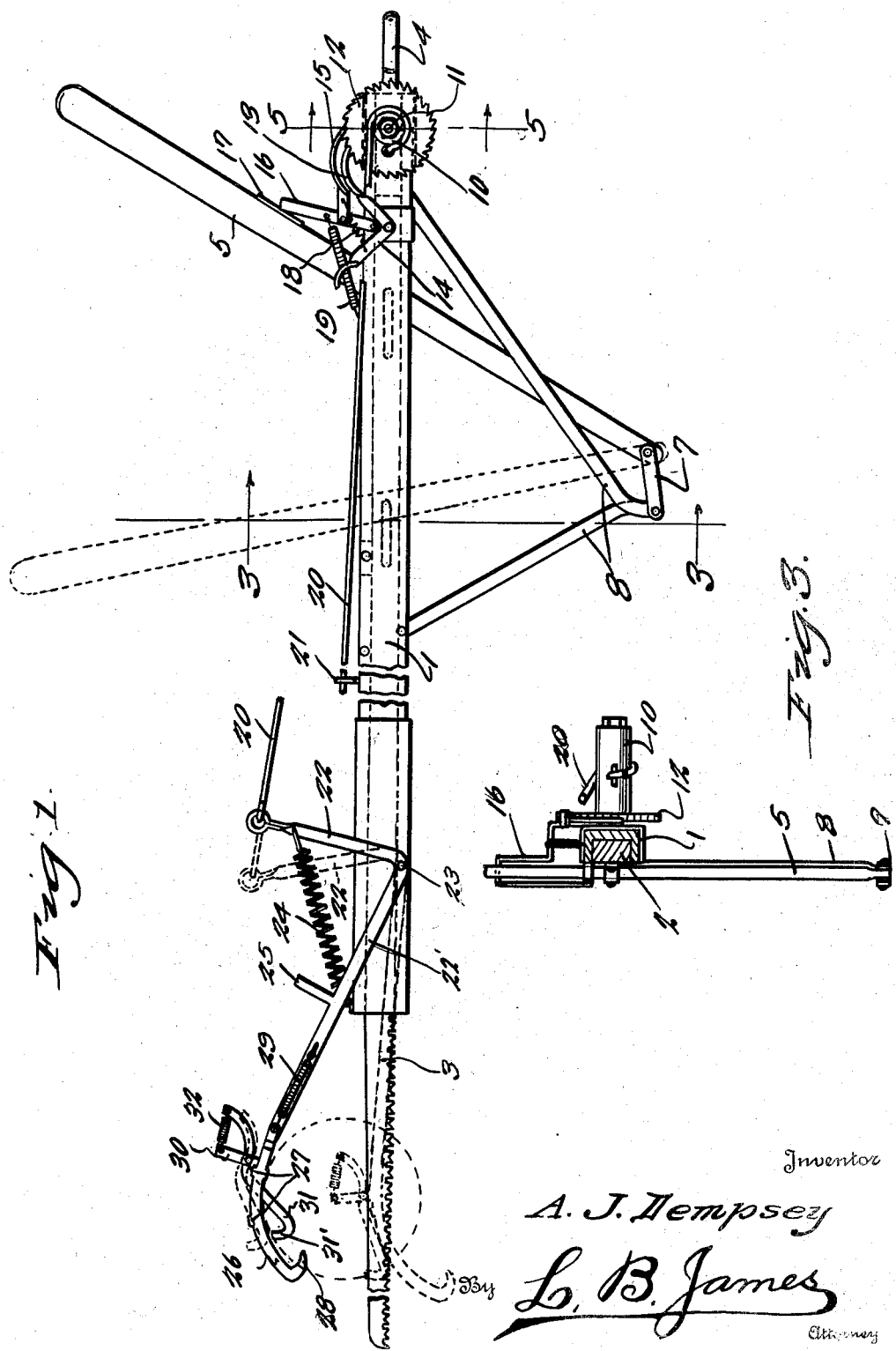
Inventor
A. J. Dempsey
By L. B. James
Attorney Sept. 12, 1939.  A. J. DEMPSEY  2,172,906
SAFETY TREE TRIMMER
Filed June 9, 1938  2 Sheets—Sheet 2
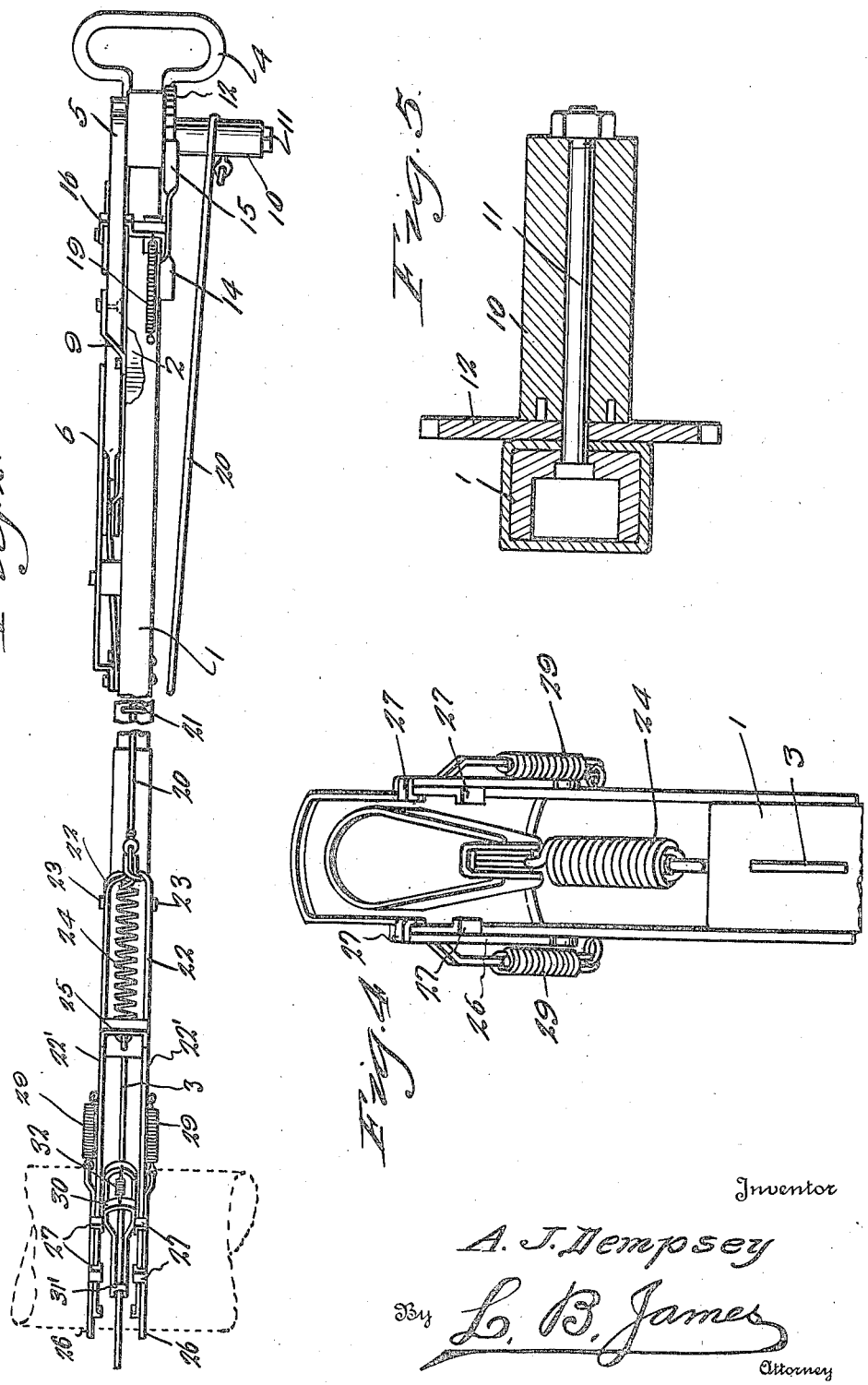
Inventor
A. J. Dempsey
By L. B. James
Attorney Patented Sept. 12, 1939

2,172,906

UNITED STATES PATENT OFFICE 2,172,906

SAFETY TREE TRIMMER

Albert J. Dempsey, San Antonio, Tex.

Application June 9, 1938, Serial No. 212,794

1 Claim. (Cl. 30—166)

This invention relates to a device for sawing limbs from trees and the like, the general object of the invention being to provide means whereby the saw can be actuated from the ground, with means for applying pressure to the saw as it cuts through the wood and for holding the saw end of the device against the limb.

The invention also consists in certain other features of construction, combination and arrangement of the several parts, to be hereinafter fully described, illustrated in the accompanying drawings and specifically pointed out in the appended claim.

In describing the invention in detail reference will be had to the accompanying drawings wherein like characters denote like or corresponding parts throughout the several views, and in which:

Fig. 1 is an elevation with parts broken away of the device.

Fig. 2 is a plan view thereof with parts broken away.

Fig. 3 is a section on line 3—3 of Fig. 1.

Fig. 4 is an enlarged view of the front end of the device.

Fig. 5 is a section on line 5—5 of Fig. 1.

In these drawings, the numeral 1 indicates an elongated housing in which reciprocates the bar 2, to the front end of which the saw blade 3 is connected. A loop shaped handle 4 is connected to the rear end of the housing and a hand lever 5 operates through a guide 6 attached to the housing and one end of the lever is connected by a link 7 to the outer ends of the brace bars 8 which have their other ends connected to the housing. A bracket 9 connects an intermediate part of the lever 5 with the saw blade operating bar 2, so that by rocking the hand lever the bar and blade will be reciprocated. A drum 10 is rotatably supported from the rear end of the housing by a bolt 11 and a ratchet wheel 12 is connected to the inner end of the drum and has its teeth engaged by a holding dog 13 formed on one end of a bell crank 14, pivoted to the housing and having its other end made in the form of a finger piece so by pressing upon this part of the bell crank the dog can be released from the ratchet wheel. A second dog 15 also engages the wheel 12 and is pivoted to a member 16 pivoted to the housing and having a part engaged by a plate 17 on the lever 5, when the lever is moved rearwardly to a certain extent. When this occurs the second dog will partly rotate the wheel 12 and the drum, the dog 13 preventing retrograde movement of the parts and a spring 18 holds both dogs in engagement with the teeth of the wheel 12. A spring 19 connects the member 16 with the housing and tends to hold said member in engagement with the plate 17. A cable 20 is connected with the drum to be partly wound thereon when the drum is moved by the dog 15 from the lever 5. Said cable passes through a guide 21 on the housing and is connected to the rear end of a double bell crank lever 22, the two parts of which straddle the front end of the housing and are pivoted thereto as shown at 23. A spring 24 connects the rear end of the member 22 with the front end of the housing and tends to throw the front end of the member 22 downwardly. The intermediate parts of the forwardly extending limbs 22' of the bell crank lever 22 are connected together by the inverted U-shaped bridge member 25 and the shank of a hook member 26 is slidably connected to the forward end of each limb 22' by the bent over ears 27. Said hook members curve downwardly, as shown and terminate in the beaks 28, for penetrating a limb of a tree, as shown in dotted lines in Figs. 1 and 2. A spring 29 connects the end of each shank with a limb 22'. A bridge piece 30 is connected with the front ends of the limbs 22' and the shanks of a double hook member 31 are pivoted to the lower parts of this piece 30 and a spring 32 connects the rear end of the member 31 to the piece 30. The front end of the member 31 is turned up into hook shape, as shown at 31' and is of inverted U-shape, so as to fit over the saw blade, in certain positions of the device, so that this part acts as a guide for the saw. As will be seen, when the cable is pulled upon and the beaks 28 are in engagement with a limb of a tree or the like, pressure will be exerted on the pivotal points 23 and thus pressure will come upon the blade to cause the same to pass through the part being sawed and the member 31 will act to guide the saw and prevent it from buckling. With this device one can stand on the ground and saw limbs from trees. The operator holds the handle 4 in one hand and actuates the lever 5 by the other hand to reciprocate the blade, the front end of the device being held to the limb by the beaks 28.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A device of the class described comprising an enlongated housing, a bar slidably arranged therein, a saw blade connected to the front end of the bar, a hand lever connected to the bar, supporting means extending from the housing for the lever, a handle at the rear end of the housing, hook means at the front end of the device for engaging the object being sawed, a bell crank member pivoted to the rear end of the housing and to the front end of which the hook means are slidably connected, a pivoted guide for the blade carried by the bell crank member, spring means tending to hold the guide in engagement with the blade, a spring for connecting the bell crank member to the front end of the housing, a cable connected with the rear of the bell crank member, a drum at the rear of the housing to which the cable is connected and ratchet means actuated by the hand lever for rotating the drum.

ALBERT J. DEMPSEY.